Aug. 16, 1932.   G. E. A. HALLETT   1,872,279
LUBRICATING SYSTEM
Filed Dec. 23, 1929

Inventor
George E. A. Hallett
By Blackmore, Spencer & Kirk
Attorneys

Patented Aug. 16, 1932

1,872,279

UNITED STATES PATENT OFFICE

GEORGE E. A. HALLETT, OF DETROIT, MICHIGAN, ASSIGNOR TO GENERAL MOTORS RESEARCH CORPORATION, OF DETROIT, MICHIGAN, A CORPORATION OF DELAWARE

LUBRICATING SYSTEM

Application filed December 23, 1929. Serial No. 416,122.

This invention relates to lubricating systems and has particular reference to a system of lubrication applied to internal combustion engines used on automotive vehicles.

The principal object of the invention is to store up a quantity of oil which may be released and forced into the lubricating system independent of the usual pump when the oil in the oil pan is in such a state that the pump will be unable to force it into the system. This condition maintains when the weather is cold and the oil becomes so viscous that the pump is unable to suck in its customary supply of oil.

The object of the invention is accomplished by providing a cylinder or container (either inside or outside the usual oil pan) and interconnecting the cylinder with a pipe connected with the delivery side of the pump. The cylinder is provided with a piston and with a spring between the piston and the container end. The spring always tends to urge the piston so as to force the oil therefrom. A catch applied to the piston and container will hold the piston in one of its extreme positions and hold the spring under compression. During the normal operation of the pump, the pressure of the oil will force the piston rearwardly to compress the spring and engage the catch and fill the reservoir with oil. The catch is suitably interconnected with the starting pedal and when the pedal is operated the catch will be released to permit the spring to force the piston forwardly in the cylinder to force the oil into the lubricating system to lubricate the working parts. By the arrangement described, a quantity of oil will be supplied to the system regardless of whether the pump is able to take up any oil from the oil pan and the danger of running the engine in an unlubricated condition is avoided.

Figure 1:
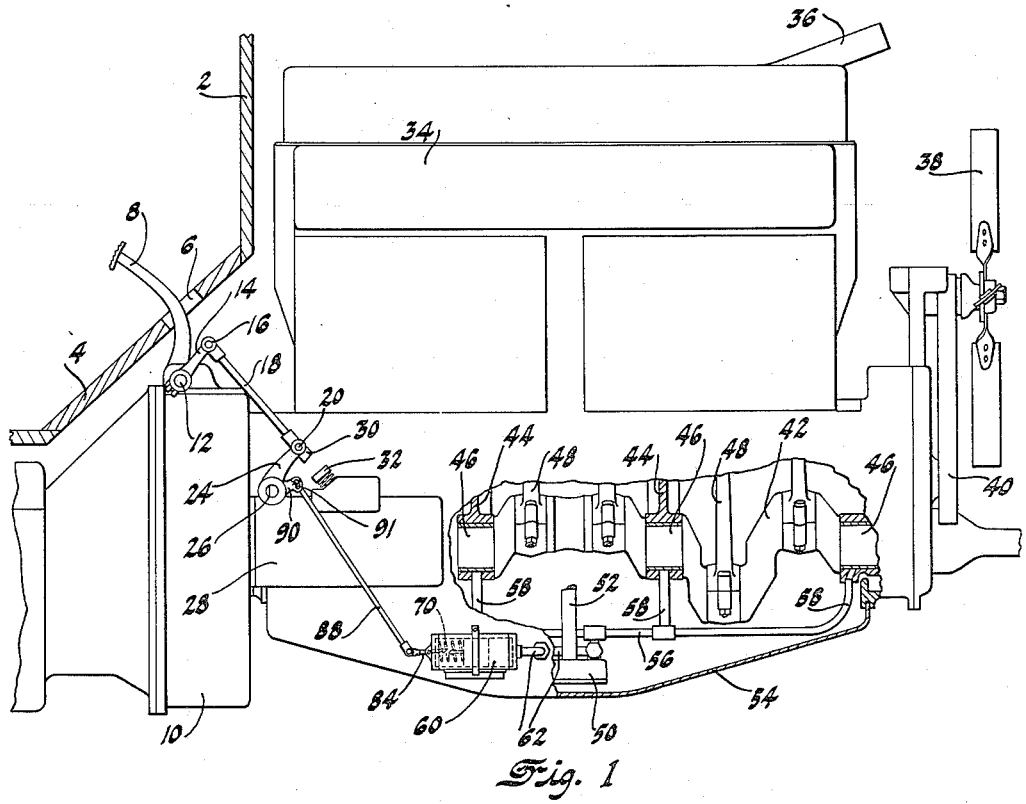
Figure 1 is a side view of so much of an automotive vehicle and its engine as is necessary to illustrate the invention.

Referring to the drawing, the numeral 2 indicates the automotive vehicle as a whole. The vehicle is provided with the usual toe board 4 having an opening 6 through which there is adapted to pass the usual starter pedal 8. The clutch housing is indicated at 10 and on the housing the shaft 12 for the pedal 8 is mounted. An arm 14 attached to the shaft is pivoted as at 16 to a link 18 pivoted at 20 to an arm 24 pivotally mounted as at 26 on the starting motor 28. A projecting end 30 on the arm 24 is adapted to engage with the starter button 32 of the starting motor 28 to place the same in operation.

The engine is indicated as a whole at 34 and has the usual water circulating system indicated at 36, the fan 38 driven by the belt 40 from the crankshaft 42. The crankshaft 42 is mounted in the end and intermediate ribs 44 of the engine block at the main bearings 46. The crankshaft is connected by the usual connecting rods 48 to the usual pistons (not shown).

A pump 50 is driven from a shaft 52 operated from the engine in any suitable way. The pump withdraws oil from the oil pan 54 and passes it to the manifold 56 having the arms 58 to deliver the oil to the main bearings 46.

The parts so far described are conventional and per se form no part of the invention.

The invention resides in the provision of a container or cylinder 60 which is shown in Figure 1 as mounted outside the oil pan 54 for purposes of clearer illustration. It is obvious that the cylinder or container 60 may be mounted inside the oil pan 54. The cylinder is connected by means of the pipe 62 to the delivery side of the pump 50 and when the pump is operating, oil will be forced through the pipe 62 into the cylinder 60. The cylinder is closed at both ends as indicated at 64 and 66 and inside the cylinder there are arranged the piston 68 and a coil spring 70. The coil spring 70 is positioned between the piston 68 and the end 66 and at all times urges the piston toward the right when considering Figures 2 and 3. In the position of the parts shown in Figure 2, the spring 70 is partially compressed. In the fully expanded position of the spring 70, the piston 68 will be forced to the extreme right of Figure 2.

Secured to the piston 68 as by means of the threaded connection 72, is one hook portion 74 of a catch indicated as a whole at 76. The second hook portion 78 is mounted by means of a ball 80 in a socket portion 82 formed at the center of the end portion 66. The hook portion 78 is provided with a shank portion 84 which projects outside the cylinder and an eye 86 is formed on the end of the shank portion 84.

By referring to Figure 1, it will be noted that the eye portion 86 of the shank 84 is interconnected by means of a link 88 to an arm 90 either formed on the arm 84 or preferably constructed separately therefrom and mounted on the shaft 26. From an examination of Figure 1, it will be apparent that when the starting pedal 8 is depressed to actuate the starter button 32 to actuate the starting motor 28 to start the engine 34, the link 88 will simultaneously be pushed downward to depress the shank portion 84 from the full line to the dotted line position shown in Figure 3. The connection between the link 88 and arm 90 is preferably by a pin and slot 91, to allow sufficient play to permit the hooks 74, 78 to move from the position of Fig. 2 to that of Fig. 3 without operating the shaft 26.

Figure 2:
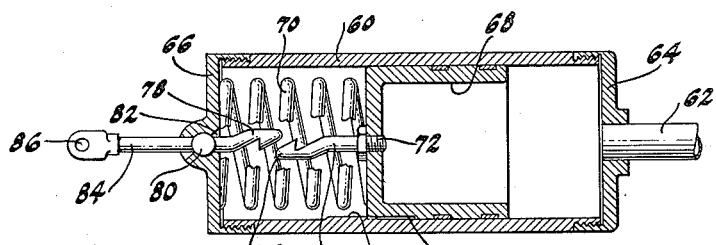
Figure 2 is an enlarged sectional detailed view through the cylinder and piston.
Figure 3:
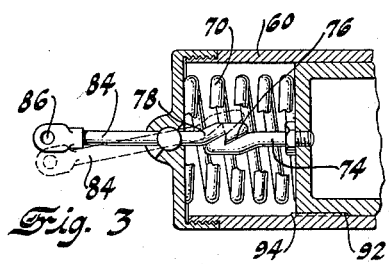
Figure 3 is a sectional view similar to Figure 2 but showing the catch engaged in full line position and disengaged in dotted line position.

By referring to Figures 2 and 3, it will be noted that the groove 92 has been provided with piston 68 and a key 94 formed on the interior of the cylinder 60. The purpose of the groove 92 and key 94 is to retain the piston 68 in position so that the hooks 74 and 78 will engage.

The operation of the device is as follows: when the engine is running and the pump 50 in operation, the oil delivered by the pump will be forced into the manifold 56 and to the pipe 62. The pressure of the pump in the manifold 56 and oil line 62 is greater than the force of the spring 70 under compression. The oil under the pressure of the pump will therefore force the piston 68 to the left (Figures 2 and 3) to fill the container 60 and cause the hook 74 to engage the hook 78 to hold the spring 70 compressed in the piston to the extreme left. This will store a quantity of oil in the cylinder 60. During cold weather when the pump 50 cannot take up oil from the oil pan due to the viscosity of the lubricant, the starting engine will (as previously described) release the latch 76 to permit the spring 70 to force the piston to the right to force the lubricant in the container or cylinder 60 into the manifold 56 to lubricate the engine. After the engine has been running for a brief period, the oil will become heated and permit the pump to take it up and pass oil into the lubricating system in the usual way. After the pump is able to take up the lubricant, the pump pressure will again force the piston 68 rearwardly and fill the container 60 with oil which will be released the instant the engine is started.

During warm weather there is substantially no need of the cylinder 60 and the link 88 may therefore be disconnected to throw the container out of the system.

I claim:

1. In a lubricating system for an engine, a pump operated from the engine and normally supplying lubricant to the system, means for storing a quantity of oil from the pump during the normal operation thereof, and means for delivering said stored oil to the oil line simultaneously with the starting of the engine.

2. In a lubricating system for engines, a pump operated from the engine and normally supplying lubricant to the system, means for storing a quantity of oil from the pump during the normal operation thereof, resilient means in said storing means, and means operated simultaneously with the starting of the engine for releasing said resilient means to force said stored oil into the lubricating system.

3. In a lubricating system for an engine, a pump operated from the engine and normally supplying lubricant to the system, a container for storing a quantity of oil from the pump during the normal running of the engine, a spring and a piston in said container, and means operative simultaneously with the starting of the engine to release said spring to actuate said piston to force the oil from said container into the system.

4. In a lubricating system for an engine, a pump operated from the engine and normally supplying lubricant to the system, a container for storing a quantity of oil from the pump during the normal running of the engine, a piston and a spring in said container, a catch connected to said piston, and means operative simultaneously with the starting of the engine to trip said catch to release said spring to operate said piston to force the oil from said container into the system.

5. In a lubricating system for an engine, a pump operated from the engine and normally supplying lubricant to the system, a container, a piston and spring in said container, said pump forcing oil into said container during the normal operation of the engine to force said piston in the container against the resistance of said spring, a catch for retaining said piston, and means for releasing said catch to cause said spring to move said piston to force oil from said container into said system.

6. In a lubricating system for engines, a pump operated from the engine and normally supplying lubricant to the system, a container adapted to receive oil forced thereinto by the pump during the normal operation of the engine, a piston in said container, a spring positioned between the piston and the container end resisting the entrance of oil into the container, a catch in the container adapted to hold said piston, and means for releasing the catch to cause said spring to move the piston to force the oil in the container into the system.

7. In a lubricating system for engines, a pump operated from the engine and normally supplying lubricant to the system, a container adapted to receive oil from the pump during the normal operation of the engine, means for normally retaining oil in the container, and means operated in timed relation with the starting of the engine for forcing the oil in said container into the system.

8. In a lubricating system for engines, a pump operated from the engine and normally supplying lubricant to the system, a container directly connected in the lubricating system and adapted to receive oil from the pump during the normal operation of the engine, means resisting the entrance of oil into the container, means for retaining said means and means operated in timed relation with the starting of the engine for releasing said retaining means to cause said first named means to force the oil in the container into the system.

In testimony whereof I affix my signature.

GEORGE E. A. HALLETT.